(12) United States Patent
Levitsky et al.

(10) Patent No.: US 12,520,338 B2
(45) Date of Patent: Jan. 6, 2026

(54) TECHNOLOGY-PRIORITY-BASED CHANNELS

(71) Applicant: QUALCOMM Incorporated, San Diego, CA (US)

(72) Inventors: Michael Levitsky, Rehovot (IL); Michael Alexander Ruder, Pommelsbrunn (DE); Moshe Ben-Ari, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 451 days.

(21) Appl. No.: 18/069,905

(22) Filed: Dec. 21, 2022

(65) Prior Publication Data

US 2024/0215062 A1 Jun. 27, 2024

(51) Int. Cl.
*H04W 72/56* (2023.01)
*H04W 24/10* (2009.01)
*H04W 72/0453* (2023.01)
*H04W 72/563* (2023.01)

(52) U.S. Cl.
CPC ......... *H04W 72/563* (2023.01); *H04W 24/10* (2013.01); *H04W 72/0453* (2013.01)

(58) Field of Classification Search
CPC ..... H04W 72/56; H04W 72/04; H04W 24/10; H04W 72/10; H04W 72/12; H04W 72/08; H04W 72/40; H04W 76/10; H04W 76/27; H04W 48/06; H04W 48/08; H04W 74/00; H04W 12/02; H04W 4/02; H04W 28/02; H04L 5/00; H04B 1/71

USPC ......................................................... 370/329
See application file for complete search history.

(56) References Cited

U.S. PATENT DOCUMENTS

| | | | | |
|---|---|---|---|---|
| 9,167,511 | B2 * | 10/2015 | Lee | H04W 16/18 |
| 9,480,076 | B2 * | 10/2016 | Jung | H04W 72/121 |
| 9,572,087 | B2 * | 2/2017 | Nagasaka | H04B 17/318 |
| 9,838,957 | B2 * | 12/2017 | Sirotkin | H04W 48/18 |
| 9,900,832 | B2 * | 2/2018 | Kim | H04W 48/18 |
| 10,582,366 | B2 * | 3/2020 | Gupta | H04L 61/2564 |
| 10,716,047 | B2 * | 7/2020 | Meylan | H04W 36/1446 |
| 10,749,806 | B2 * | 8/2020 | Jeong | H04W 40/02 |
| 10,897,722 | B2 * | 1/2021 | Henry | H04L 47/20 |
| 11,546,841 | B2 * | 1/2023 | Rinne | H04W 36/1443 |
| 11,817,947 | B2 * | 11/2023 | Baldemair | H04L 5/1453 |
| 11,991,564 | B2 * | 5/2024 | Uchino | H04W 72/569 |
| 2016/0119861 | A1 * | 4/2016 | Jin | H04W 48/16 |
| | | | | 370/338 |
| 2019/0124545 | A1 * | 4/2019 | Gandhi | H04W 36/14 |
| 2023/0239902 | A1 * | 7/2023 | Wu | H04W 74/002 |
| | | | | 370/329 |

* cited by examiner

*Primary Examiner* — Man U Phan
(74) *Attorney, Agent, or Firm* — Harrity & Harrity, LLP

(57) ABSTRACT

Various aspects of the present disclosure generally relate to wireless communication. In some aspects, a wireless communication device (WCD) may obtain, on a technology-priority-based channel, a measurement associated with a detection of a communication associated with a first priority technology. The WCD may transmit, to one or more WCDs associated with a second priority technology that is associated with the technology-priority-based channel, an indication of the measurement associated with the detection of the communication associated with the first priority technology. Numerous other aspects are described.

30 Claims, 11 Drawing Sheets

TECHNOLOGY-PRIORITY-BASED CHANNELS

FIELD OF THE DISCLOSURE

Aspects of the present disclosure generally relate to wireless communication and to techniques and apparatuses for technology-priority-based channels.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device (WCD). The method may include obtaining, on a technology-priority-based channel, a measurement associated with a detection of a communication associated with a first priority technology. The method may include transmitting, to one or more WCDs associated with a second priority technology that is associated with the technology-priority-based channel, an indication of the measurement associated with the detection of the communication associated with the first priority technology.

Some aspects described herein relate to a method of wireless communication performed by a WCD. The method may include receiving, from one or more WCDs, one or more indications of measurements associated with detection, on a technology-priority-based channel, of a communication associated with a first priority technology. The method may include selectively vacating or camping, for communications associated with a second priority technology, on the technology-priority-based channel based at least in part on the one or more indications of measurements.

Some aspects described herein relate to a WCD for wireless communication. The wireless communication device may include a memory and one or more processors coupled to the memory. The one or more processors may be configured to obtain, on a technology-priority-based channel, a measurement associated with a detection of a communication associated with a first priority technology. The one or more processors may be configured to cause the WCD to transmit, to one or more WCDs associated with a second priority technology that is associated with the technology-priority-based channel, an indication of the measurement associated with the detection of the communication associated with the first priority technology.

Some aspects described herein relate to a WCD for wireless communication. The WCD may include a memory and one or more processors coupled to the memory. The one or more processors may be configured to receive, from one or more WCDs, one or more indications of measurements associated with detection, on a technology-priority-based channel, of a communication associated with a first priority technology. The one or more processors may be configured to selectively vacate or camp for communications associated with a second priority technology, on the technology-priority-based channel based at least in part on the one or more indications of measurements.

Some aspects described herein relate to a non-transitory computer-readable medium that stores a set of instructions for wireless communication by a WCD. The set of instructions, when executed by one or more processors of the WCD, may cause the WCD to obtain, on a technology-priority-based channel, a measurement associated with a detection of a communication associated with a first priority technology. The set of instructions, when executed by one or more processors of the WCD, may cause the WCD to transmit, to one or more WCDs associated with a second priority technology that is associated with the technology-priority-based channel, an indication of the measurement associated with the detection of the communication associated with the first priority technology.

Some aspects described herein relate to a non-transitory computer-readable medium that stores a set of instructions for wireless communication by a WCD. The set of instructions, when executed by one or more processors of the WCD, may cause the WCD to receive, from one or more WCDs, one or more indications of measurements associated with detection, on a technology-priority-based channel, of a communication associated with a first priority technology. The set of instructions, when executed by one or more processors of the WCD, may cause the WCD to selectively vacate or camp, for communications associated with a second priority technology, on the technology-priority-based channel based at least in part on the one or more indications of measurements.

Some aspects described herein relate to an apparatus for wireless communication. The apparatus may include means for obtaining, on a technology-priority-based channel, a measurement associated with a detection of a communication associated with a first priority technology. The apparatus may include means for transmitting, to one or more WCDs associated with a second priority technology that is associated with the technology-priority-based channel, an indication of the measurement associated with the detection of the communication associated with the first priority technology.

Some aspects described herein relate to an apparatus for wireless communication. The apparatus may include means for receiving, from one or more WCDs, one or more indications of measurements associated with detection, on a technology-priority-based channel, of a communication associated with a first priority technology. The apparatus may include means for selectively vacating or camping, for communications associated with a second priority technology, on the technology-priority-based channel based at least in part on the one or more indications of measurements.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
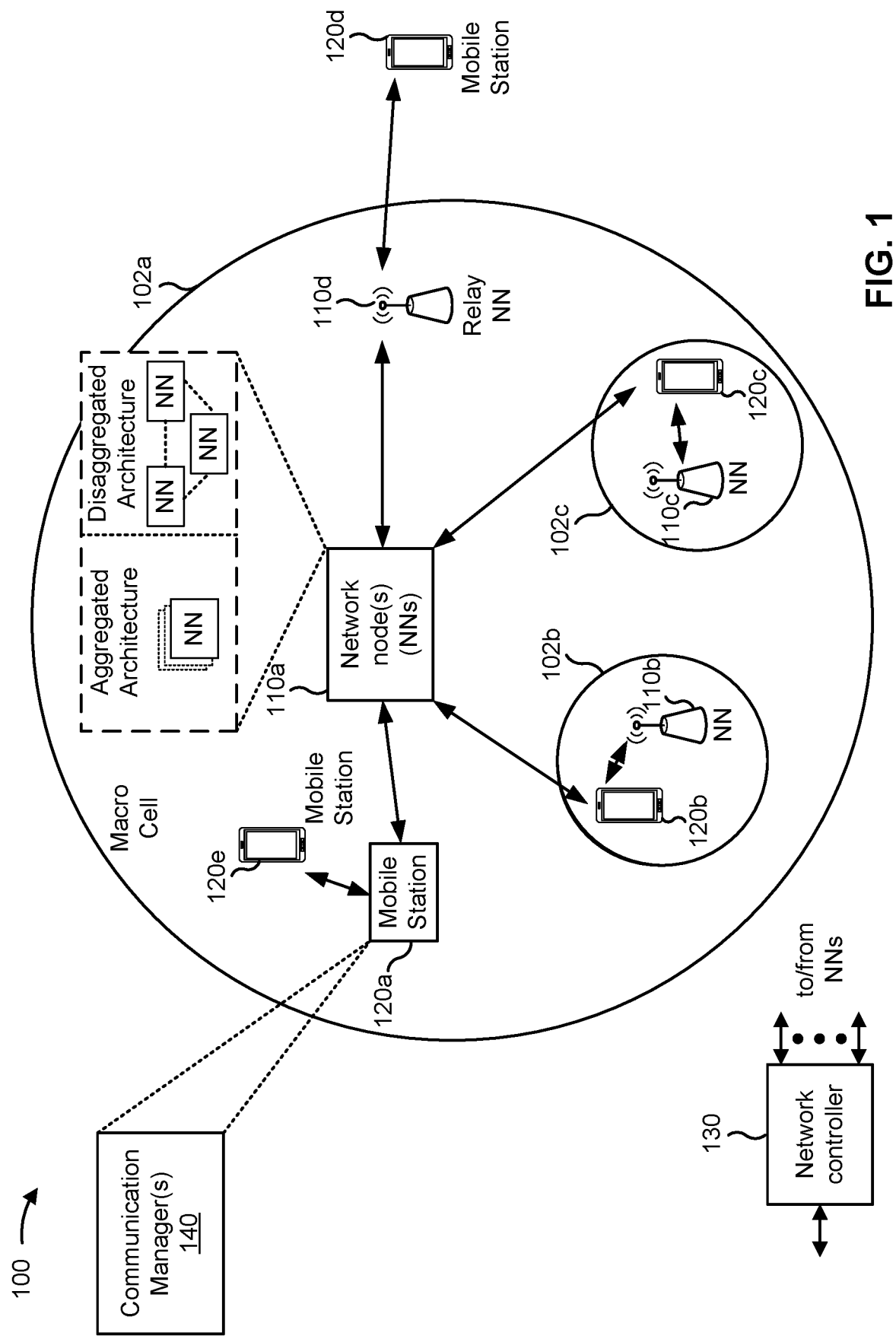
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless communication device (WCD) (e.g., a UE) may include a communication manager 140. As described in more detail elsewhere herein, the communication manager 140 may obtain, on a technology-priority-based channel, a measurement associated with a detection of a communication associated with a first priority technology; and transmit, to one or more WCDs associated with a second priority technology that is associated with the technology-priority-based channel, an indication of the measurement associated with the detection of the communication associated with the first priority technology. As described in more detail elsewhere herein, the communication manager 140 may receive, from one or more WCDs, one or more indications of measurements associated with detection, on a technology-priority-based channel, of a communication associated with a first priority technology; and selectively vacate or camp, for communications associated with a second priority technology, on the technology-priority-based channel based at least in part on the one or more additional indications of measurements. Additionally, or alternatively, the WCD may selectively vacate or camp on the technology-priority-based channel based at least in part on a measurement obtained by the WCD (e.g., from a measurement at the WCD). In some aspects, the WCD may receive the one or more additional indications of measurements from other WCDs (e.g., associated with the second priority technology or infrastructure terminals with dual technology capabilities). The one or more additional indication of measurements may be associated with detection of a communication associated with a first priority technology on the technology-priority-based channel. Additionally, or alternatively, the communication manager 140 may perform one or more other operations described herein.

As indicated above, FIG. 1 is provided as an example. Other examples may differ from what is described with regard to FIG. 1.

Figure 2:
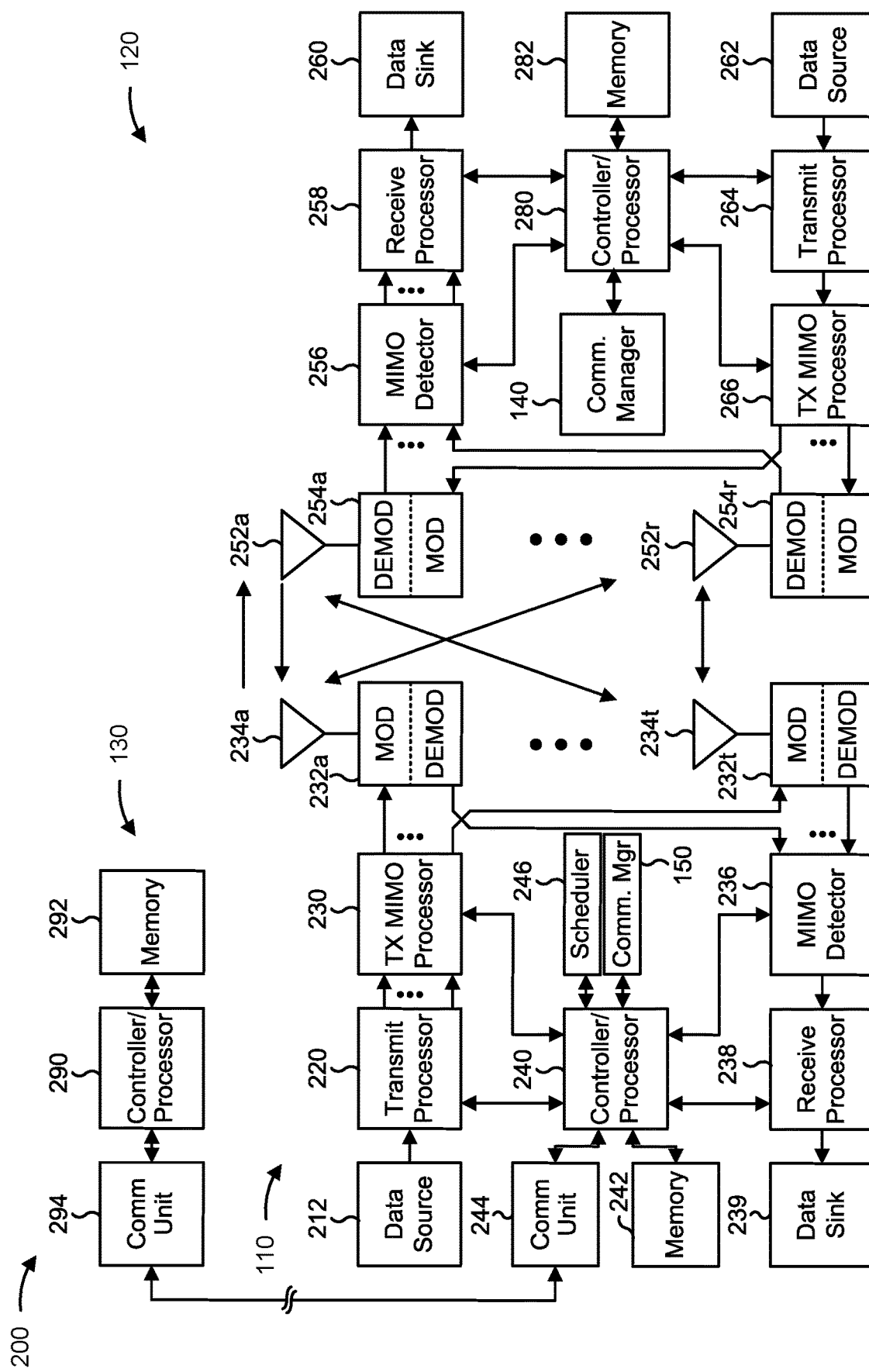
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-11).

The controller/processor 240 of the network node 110, the controller/processor 280 of the UE 120, and/or any other component(s) of FIG. 2 may perform one or more techniques associated with technology-priority-based channels, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a WCD includes means for obtaining, on a technology-priority-based channel, a measurement associated with a detection of a communication associated with a first priority technology; and/or means for transmitting, to one or more WCDs associated with a second priority technology that is associated with the technology-priority-based channel, an indication of the measurement associated with the detection of the communication associated with the first priority technology. In some aspects, the WCD includes means for receiving, from one or more WCDs, one or more indications of measurements associated with detection, on a technology-priority-based channel, of a communication associated with a first priority technology; and/or means for selectively vacating or camping, for communications associated with a second priority technology, on the technology-priority-based channel based at least in part on the one or more additional indications. A selection of vacating or camping may be based at least in part on a local measurement and one or more additional indications of measurements received from other WCDs (e.g., associated with the second priority technology or infrastructure terminals with dual technology capabilities) and associated with detection of a communication associated with a first priority technology on the technology-priority-based channel. In some aspects, the means for the WCD to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
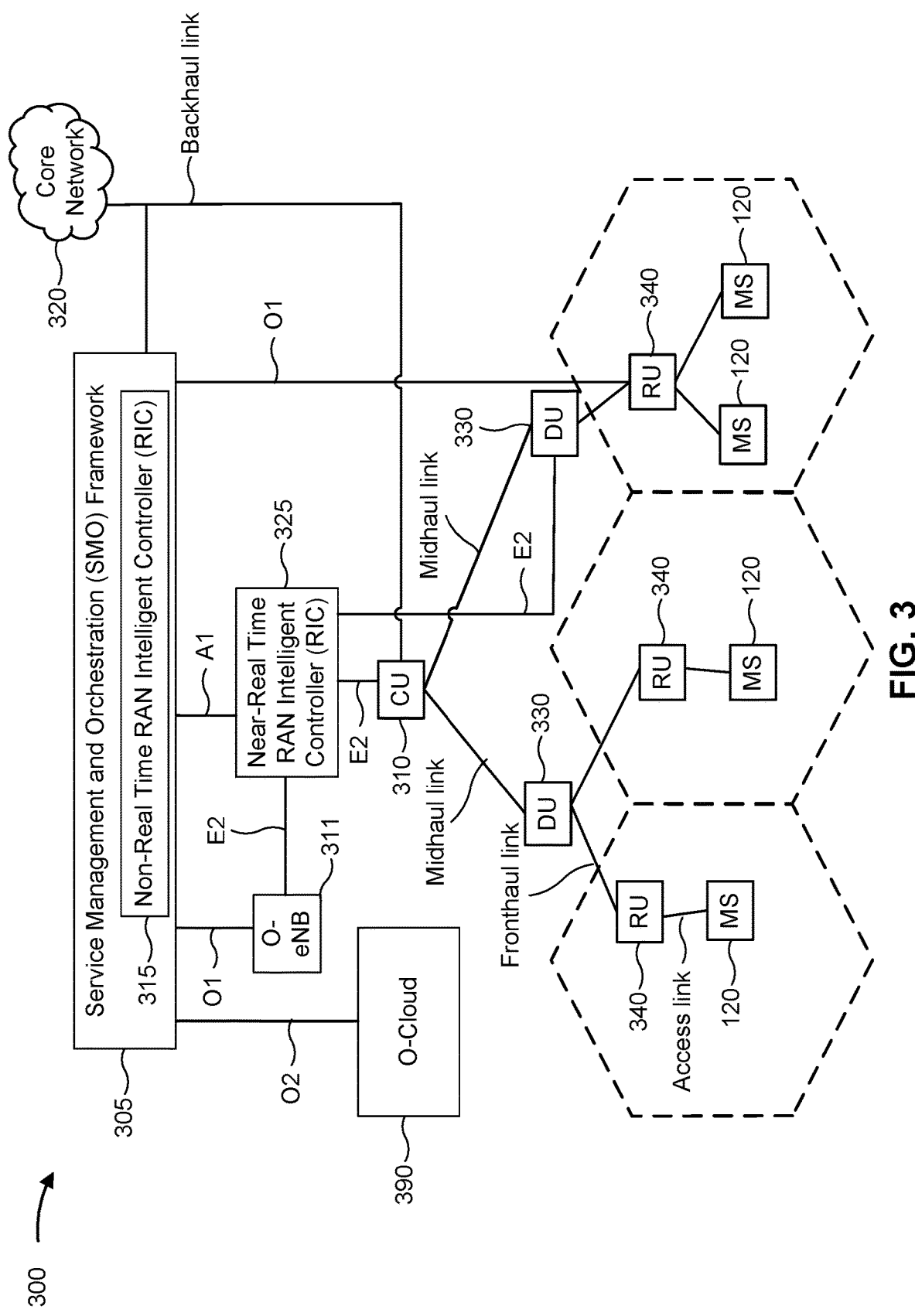
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
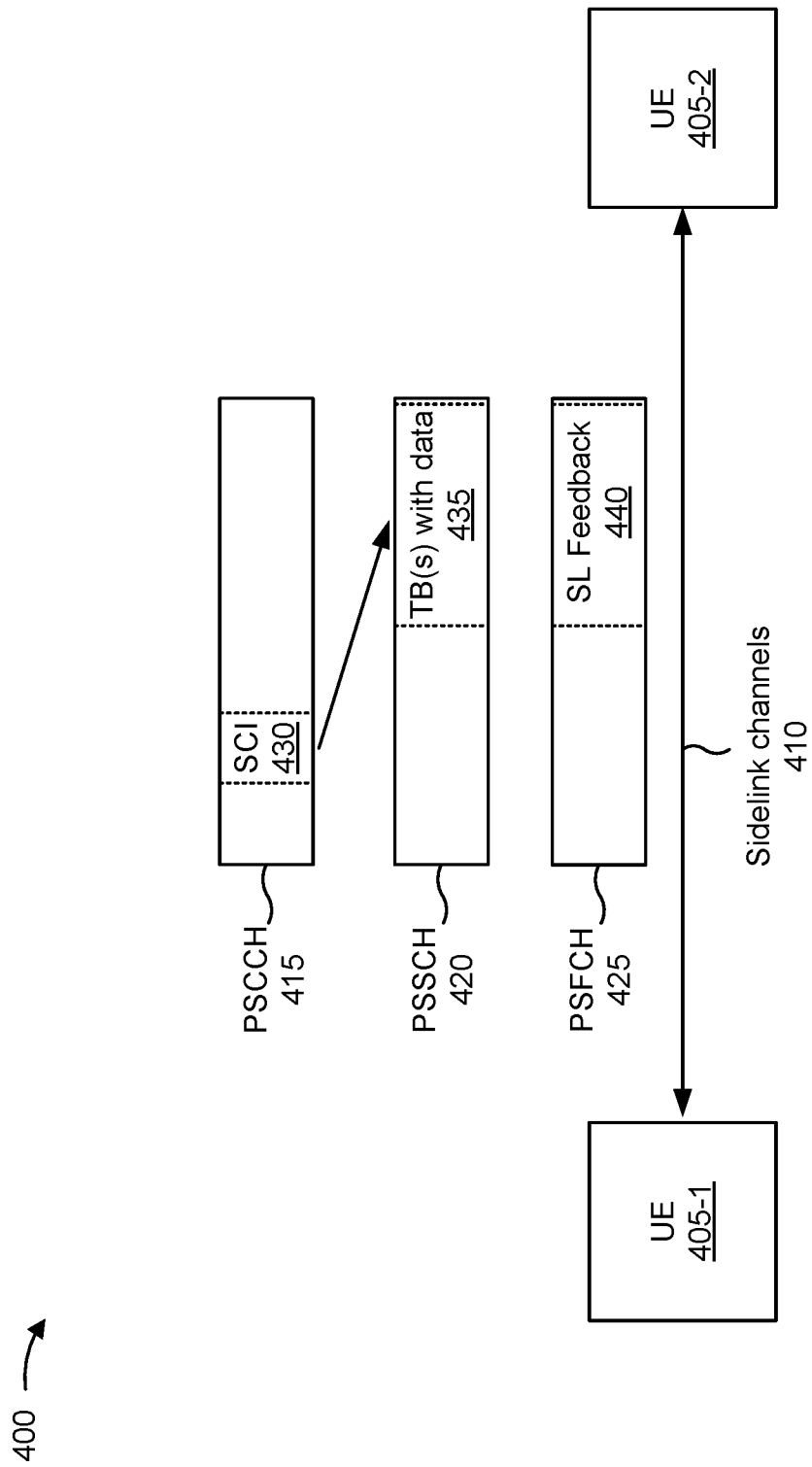
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing and/or a sidelink synchronization signal (SLSS).

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 420, such as a hybrid automatic repeat request (HARQ) process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent resource blocks (RBs) in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in a radio resource control (RRC) message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel occupancy and/or availability for transmissions. For example, the UE 405 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may decide on sidelink grants and/or access, and related resources and may transmit related control information and/or the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or a modulation and coding scheme (MCS) to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
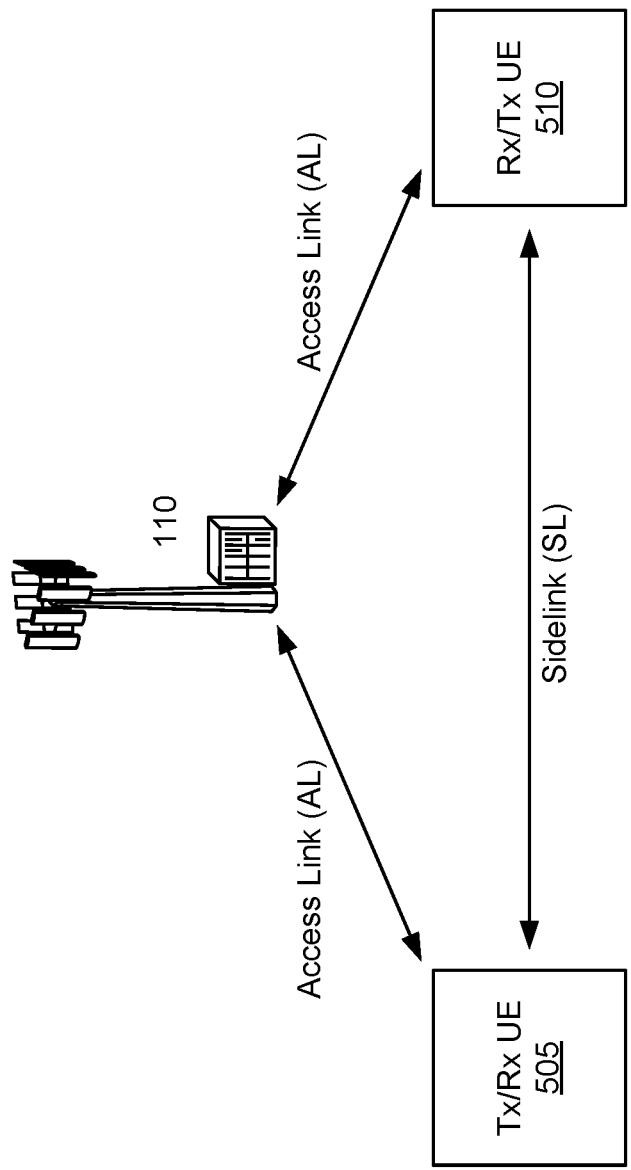
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
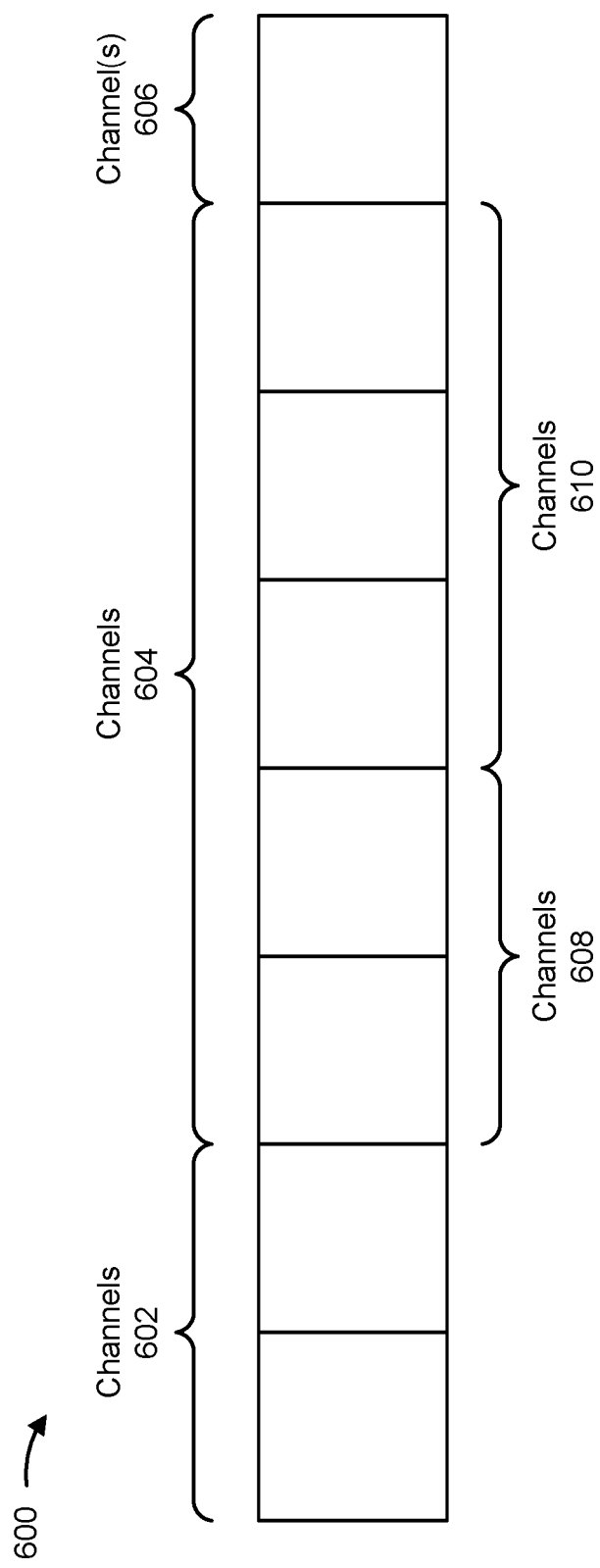
FIG. 6 is a diagram illustrating an example of channels using multiple wireless communication technologies.

FIG. 6 is a diagram illustrating an example 600 of channels using multiple wireless communication technologies. For example, a first wireless communication technology and a second wireless communication technology may be used on different channels and/or on one or more overlapping channels.

As shown in FIG. 6, a frequency bandwidth for wireless communication (e.g., on a band) may include channels 602, channels 604, and channels 606. Channels 602, channels 604, and channels 606 may each include one or more channels (e.g., a bandwidth of frequencies). Each of the channels 602, 604, and 606 may include different frequency portions of the frequency bandwidth. Channels (e.g., each channel) within the channels 602, 604, and 606 may have a same bandwidth (e.g., 10 MHz) or may have different bandwidths.

In some environments, each of the channels 602, 604, and 606 may be associated with a different type of communications. For example, channels 602 may be designated for non-safety-related intelligent transport systems (ITS) communications. Channels 604 may be designated for safety-related ITS communications (e.g., road safety communications). Channel(s) 606 may be designated for safety-related urban rail ITS communications.

In some networks, multiple wireless communication technologies may be used on the channels 604. For example, institute of electrical and electronics engineers (IEEE)-based wireless communication technology (e.g., Wi-Fi technology and/or wireless local area network (WLAN) technology) and 3GPP-based wireless communication technology (e.g., cellular technology, such as 5G among other examples) may be used within the channels 604.

A network may configure one or more parameters for coexistence of a first wireless communication technology and a second wireless communication technology on the channels 604. For example, one or more channels of channels 604 may use a priority framework where channels are not assigned with equal status and, on some channels, specific wireless communication technologies have priority. In some aspects, the one or more parameters for coexistence may be defined by a communication protocol and/or may be predefined per geographic area, such that based at least in part on terminal location, the WCD may apply preconfigured parameters. In this way, the WCD may communicate without a network-assisted configuration (e.g., for a PC5 mode operation).

In some networks and/or geographical areas, wireless communication technologies without priority (e.g., with lower priority relative to at least one other wireless communication technology) in a channel will be allowed to use the channel only if it is not used by a wireless communication technology with higher priority. For example, a WCD may use the channel for communications using the wireless communication technology without priority when there is no deployment and/or active terminal of higher priority wireless communication technology on the channel and in a coverage area of the WCD. If the channel is used by the wireless communication technology with higher priority, the WCD may be obliged to vacate the channel.

In some networks or geographical areas, the WCD may apply a detect and vacate (D&V) procedure when communicating on the channel while using the wireless communication technology without priority. For example, the D&V procedure may include detection of whether the channel is used for communications associated with a wireless communication technology having a higher priority on the channel (e.g., the channel is occupied) than a wireless communication technology used by the WCD. Based at least in part on detection that the channel is occupied, the WCD may vacate the channel (e.g., ceased transmissions using frequency and time resources of the channel). Based at least in part on detection that the channel is available (e.g., not occupied by a higher priority technology transmissions and/or communications), the WCD may use the channel for communications using the wireless communication technology that has a lower priority on the channel.

In some examples, all channels of a road safety channels group and/or sub-band may be accessible to one or more allowed technologies (e.g., cellular V2X (CV2X) or an IEEE-based communication protocol). D&V may be used as a channel sharing mechanism to avoid road safety channels bandwidth fragmentation or segregation. An initial prioritization may be achieved by not requiring D&V on one or more channels.

In some examples, WCDs (e.g., mobile stations and/or vehicles) may operate in a corresponding anchor channel where the WCDs and associated wireless communication technology have highest priority.

In some examples, a D&V procedure may be symmetric and technology neutral. In some examples, the D&V procedure may support future wireless communication technologies (e.g., current and subsequent specifications of NR-V2X and a subsequent DSRC specification based on 802.11bd, which may be referred to as an IEEE-based communication protocol). The D&V procedure may account for a possibility of using different bandwidth channels (e.g., 10 MHz or 20 MHz channels).

As shown in FIG. 6, channels 604 may include a subset of channels 608 and a second subset of channels 610. The subset of channels 608 may have a priority for a first technology and the subset of channels 610 may have a priority for a second technology.

As indicated above, FIG. 6 is provided as an example. Other examples may differ from what is described with respect to FIG. 6.

Figure 7:
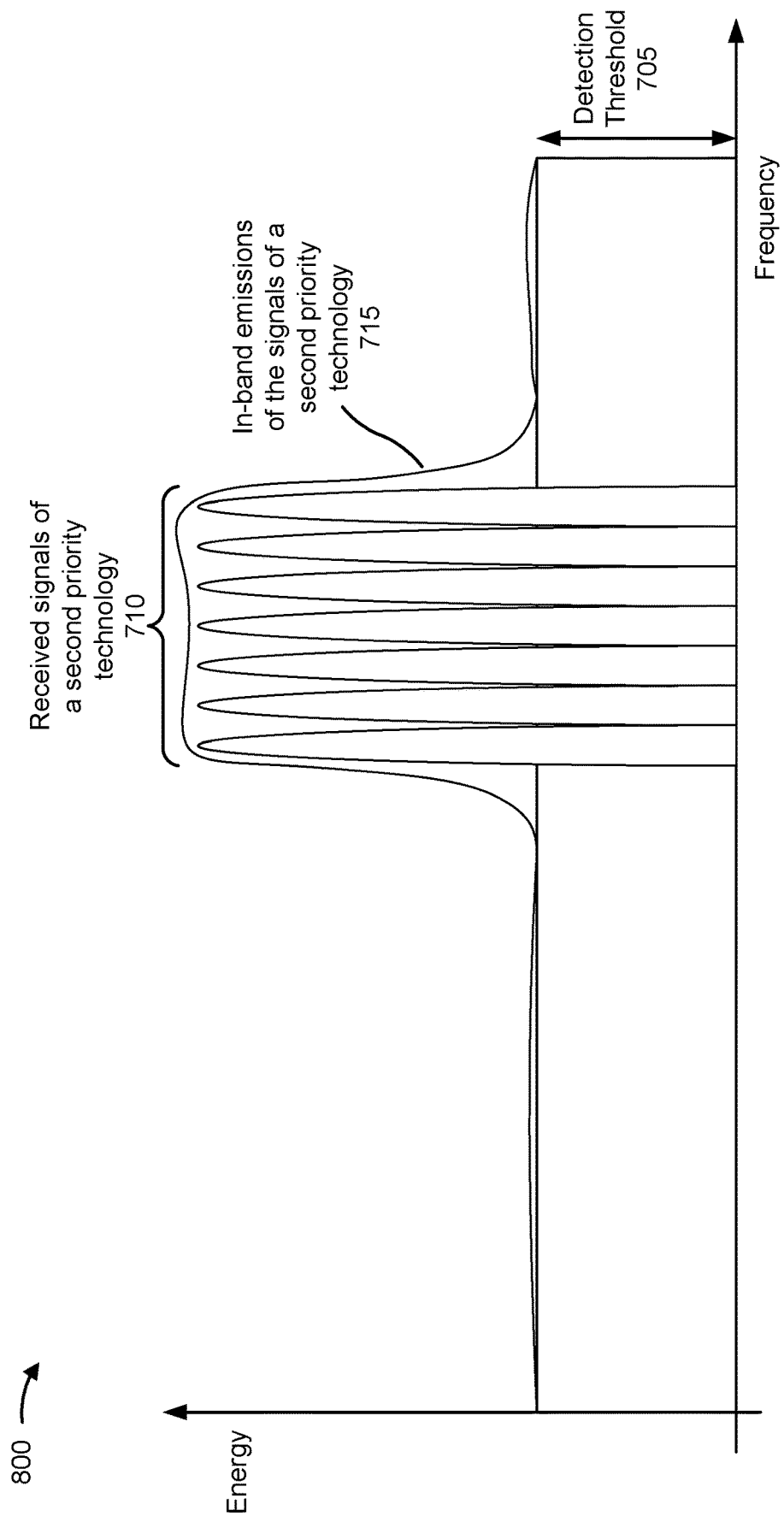
FIG. 7 is a diagram illustrating an example associated with channels using multiple wireless communication technologies.

FIG. 7 is a diagram illustrating an example 700 associated with channels using multiple wireless communication technologies. For example, a first wireless communication technology and a second wireless communication technology may be used on a channel having a bandwidth shown in FIG. 7.

In context of FIG. 7, a WCD may monitor the channel (e.g., a technology-priority-based channel) where a communication technology used by the WCD on the channel has a lower priority of a first priority technology. The WCD may monitor the channel to detect a presence of transmissions using a first priority technology (e.g., having a higher priority on the channel) as part of a D&V procedure. The WCD may monitor the channel for communications using a second priority technology (e.g., a wireless communication technology used by the WCD to communicate with one or more additional WCDs). For example, in FIG. 7, a monitoring WCD may use CV2X (LTE or NR based) technology, and this technology may have a lower priority than another technology on a specific technology-priority-based channel that is monitored.

The WCD may have a detection threshold 705 that indicates a minimum received signal or allocation energy level associated with the receiver sensitivity for control channels data channel, or both channels (e.g., a minimum signal energy that can be successfully detected and/or demodulated) for the communication technology used by the WCD. The WCD is expected to be able to detect and demodulate signals associated with the second communication technology having an energy level that satisfies the sensitivity threshold. In case the WCD detects a signal energy level (e.g., RSSI) that satisfies the sensitivity level and is not able to detect a corresponding message associated with the second priority technology, the scenario is likely to be linked with presence of the first priority technology signal on the channel. The sensitivity level may depend on an overall in-channel signal energy (e.g., determined based at least in part on all transmissions overlapping in time and based at least in part on active allocations and/or subchannels if CV2X is the second priority technology on the channel) and a corresponding automatic gain control (AGC) operational point. Detection of a transmission using the first priority technology by the WCD (e.g., supporting only a lower priority technology, such as the second priority technology) may be performed indirectly and based at least in part on side information and/or measurements coupled to lower priority technology signals detection and demodulation trials. For such a scenario, due to in-channel selectivity limitations (e.g., when there is a combination of a relatively strong second priority technology signals and a relatively weak first priority technology signal overlapping in time on the same channel), the weak first priority technology signal may not be detected and may not satisfy the threshold 705 at the monitoring WCD. Based at least in part on the WCD locally detecting signals (e.g., referred to as local detection) associated with the first priority technology having energy that satisfies the detection threshold 705 (and/or other thresholds related to evaluation of a higher priority technology detection), the WCD may vacate the channel.

The WCD may receive one or more signals 710 of the second priority technology (e.g., CV2X) via the channel. For example, the WCD may receive the received signals 710 via a subset of frequencies and/or subchannels of the channel. As shown in FIG. 7, energy of the received signals 710 may satisfy the detection and/or sensitivity threshold 705. In this way, the received signals 710 may mask an overlapping transmission of a weaker first priority technology signal (e.g. an IEEE-based communication protocol signal) which will have a negligible impact on demodulation of the received signals 710 and may not be detected via a measurement associated with the demodulation of the received signals (e.g. RSRP measurement comparison with the corresponding RSSI measurement per received signal), which may prevent the WCD from detecting signaling of the first priority technology that would satisfy a detection metric threshold for the overlapping part of the channel frequencies (e.g., a metric based at least in part on RSRP and RSSI "consistency" for demodulated CV2X signals) and/or the detection threshold 705 for non-overlapping frequencies of the channel and would cause the WCD to vacate the channel.

The received signals 710 may introduce and/or be associated with in-band emissions 715 of transmissions of received signals of the second priority technology. As shown in FIG. 7, the in-band emissions 715 may also be associated with energy that satisfies the detection threshold 705. For channel resources occupied by the in-band emissions satisfying the detection threshold 705, the WCD may expect to obtain a successful message detection for the second priority technology. This detection cannot take place since there is no allocation on these resources for the second priority technology and this scenario may be mistakenly interpreted by the WCD (e.g. a CV2X receiver) as an indication of a presence of an overlapping signal associated with the first priority technology (e.g. false detection of an IEEE-based communication protocol signal presence) and may cause the WCD to vacate the channel. To avoid such a false detection events that may result in a biased first priority technology detection metric behavior, resources and/or allocations of the second priority technology that are associated with and/or impacted by detection of an RSRP that exceeds a threshold may be excluded. This may increase an overall minimum time required for a reliable first priority technology presence detection on the channel and/or may increase misdetection in some scenarios.

In examples where the first priority technology and the second priority technology are V2X (e.g., LTE V2X or NR V2X) and an IEEE-based communication protocol wireless communication technologies, detection of the first priority technology (either V2X or the an IEEE-based communication protocol) by a WCD using the second priority technology (either an IEEE-based communication protocol or V2X) may have errors and may have insufficient reliability or responsivity (as addressed by the previous examples). As addressed in the previous examples, a WCD using V2X and detecting an IEEE-based communication protocol may detect occupancy based at least in part on a "consistency" test between RSSI and RSRP measurement on detected V2X allocations (e.g., with PSCCH successful decoding). The WCD may reuse existing measurements of CV2X receiver (e.g., RSSI and RSRP may be evaluated for channel sensing and autonomous transmission scheduling procedures). However, the WCD may experience poor detection characteristics (e.g., misdetection, false detection probabilities and required minimum monitoring time for a reliable detection, among other examples) for interfering an IEEE-based communication protocol transmissions on at least partially overlapping resources used for V2X transmissions by a relatively close V2X WCD (e.g., V2X energy is relatively high and a DSRC signal energy that is relatively weak may fail to be detected in some scenarios or may be falsely detected in other scenarios due to a related V2X signals mask and/or inband emissions). The issue may be caused at least in part on by in-channel selectivity (ICS) limitations and by in-band emissions (IBE) associated with relatively strong V2X signals as shown in FIG. 7.

As indicated above, FIG. 7 is provided as an example. Other examples may differ from what is described with respect to FIG. 7.

Some WCDs may attempt to avoid a biased detection metric behavior (e.g., a bias toward false detection of the interfering technology) by excluding V2X resources and/or allocations with, or impacted by, relatively strong signals where RSRP is greater than a threshold. This, in turn, may increase an overall minimum time required for a reliable detection and may also cause mis-detection in some scenarios.

A WCD using an IEEE-based communication protocol and detecting V2X may detect occupancy based at least in part on the "consistency" test between RSSI measurement for detecting a DSRC packet and an L-SIG decoding pass or fail result associated with the DSRC packet. The WCD may reuse existing measurements for an IEEE-based communication protocol technology (e.g., RSSI may be evaluated as a part of a clear channel assessment (CCA) for contention-based access to the channel). The WCD may use the detection for both 802.11p and 802.11bd.

However, a V2X interference detection metric may not be robust and responsive based at least in part on L-SIG being transmitted using a relatively robust MCS (binary phase shift keying (BPSK) ½) and L-SIG decoding may be successful even in case of a collision between an interfering V2X signal and a DSRC reception packet with energy that is slightly higher or comparable with energy of the V2X signal (while the data portion of the DSRC reception packet using a less robust MCS compared to L-SIG is likely to fail decoding in this case due to the interfering V2X signal).

The detection procedure may be effective in case of a V2X interfering signal with a higher power or RSSI than the DSRC reception packet, assuming that the DSRC packet can still be detected and L-SIG decoding will be triggered but will fail.

Correspondingly, a limited subset of relative powers combinations or relative powers range (e.g., that is statistically dependent on a congestion level for both technologies on the channel) between V2X and DSRC signals may support an efficient interfering technology detection result. Accordingly, for some scenarios, a detection time required for a reliable detection may be relatively long, misdetection or false detection probabilities may be relatively high in general, and reliable detection may be possible when the interfering transmission comes from a relatively close WCDs.

In some aspects described herein, a WCD may use a technology-priority-based channel for communication, where the technology-priority-based channel is associated with a first priority technology having a higher priority and a second priority technology having a lower priority. The WCD may use the technology-priority-based channel for communication using the second priority technology and by employing a D&V procedure on the channel (detecting whether the technology-priority-based channel is available or occupied by transmissions associated with the first priority technology).

The WCD associated with the second priority technology on the channel may transmit an indication of a measurement (e.g., a detection decision) associated with detection of a communication associated with the first priority technology, which may enable one or more additional WCDs to use the indication to determine whether the technology-priority-based channel is occupied or available. Similarly, the WCD may receive an indication of measurements from the one or more additional WCDs (associated with the second priority technology) to use in a determination of whether the technology-priority-based channel is occupied or available. This may be referred to as a collaborative and/or distributed detection of a higher-priority technology in the technology-priority-based channel to support the D&V procedure.

In some aspects, before vacating or muting transmissions on a technology-priority-based channel that is prioritized for the first priority technology that is detected by the WCD as being occupied by the first priority technology (e.g., active or in-use), the WCD using the second priority technology (having a lower priority than the first priority technology) may transmit (e.g., broadcast) an indication to the one or more additional WCDs (e.g., using the second priority technology) to indicate that the channel is occupied and/or is to be vacated (e.g., with a channel "busy" status).

The one or more additional WCDs may be monitoring for communications using the second priority technology on the technology-priority-based channel. These lower priority technology WCDs monitoring this channel typically will have a better native technology (second priority technology) sensitivity range vs higher priority technology presence detection range. Correspondingly, higher priority technology detection information will be obtained by some WCDs in advance or faster via the broadcasted indication. Based at least in part on this, in some cases higher-priority technology detection information may be obtained by some WCDs by a broadcasted indication before detecting first priority technology presence on the channel locally at the WCDs. In this way, the WCDs may vacate the technology-priority-based channel with reduced latency (a more responsive D&V implementation) and may reduce communication errors for communications using the first priority technology on the technology-priority-based channel that otherwise may have interference caused by communications using the second priority technology.

Some WCDs experiencing a local higher-priority tech mis-detection event may obtain the indication broadcasted by other WCDs (e.g., other WCDs distributed in the network) using the lower-priority technology and having a different locations and experiencing a better higher-priority technology detection conditions (e.g., detection probability is scenario-dependent and may be different at different locations). In this way, the WCDs may detect occupancy by communications using the first priority technology with improved accuracy and detection latency.

In case a WCD identifies the technology-priority-based channel as available (e.g., no higher-priority technology deployment on the technology-priority-based channel), the WCD may broadcast an indication that the technology-priority-based channel has a "free" channel status. In this way, other WCDs using the second priority technology may use the technology-priority-based channel with reduced "listening" time (TSENS/TOFF) before starting to transmit on the technology-priority-based channel.

Since false positive or false negative detection has a non-zero probability, to avoid a cascading effect of false or mis-detection on other WCDs receiving the indication, the WCD may include a reliability metric and/or weight as evaluated locally by the WCD that detected occupancy or availability associated with the indication. The reliability metric may indicate a confidence of the WCD in an accuracy of the indication. In some aspects, the reliability metric and/or weight may be derived based at least in part on a ratio and/or difference between a local detection metric value and a detection threshold. In some aspects, the WCD may transmit the indication only if a detection reliability is above a threshold.

Addition of the reliability metric for the indication may support an effective combining and/or superposition of a local detection metric and/or status (e.g., detected locally at a receiving WCD) and a received indication (e.g., broadcasted by one or more additional WCDs).

In some aspects, network nodes (e.g., road-side units (RSUs)) may be expected to have a dual technology access across relevant ITS band channels and correspondingly may have a dual detection capability and/or knowledge based at least in part on being aware about traffic on all the relevant ITS band channels. In this way, network nodes (e.g., RSUs) may also distribute a reliable channel usage status (e.g., free or occupied) for WCDs using a lower-priority technology within a coverage range of the network nodes.

Since reliability of the detection indication may be different for a mobile ITS terminal (e.g., WCD or UE) and RSUs (e.g., with a relatively high reliability for indications), the indication of the measurement associated with the detection of the communication associated with the higher-priority technology may include an indication of a device-type of WCD (e.g., RSU or a UE).

In some aspects, the indication may include an indication of the detected occupancy or availability of the channel, a reliability metric/weight associated with the indication (and the decision/measurements on which it is based), and/or the device-type. In some aspects, the indication may further indicate a location of WCD that provided the indication, a channel bandwidth and/or channel index for which the indication was evaluated (e.g., both 10 MHz and 20 MHz channels may be relevant for ITS bands).

In some aspects, the indication that indicates a channel "busy" status may be repeated and/or transmitted multiple times to increase a probability of reception by other lower-priority technology WCDs listening to the channel (e.g., to mitigate possible collision events with higher-priority technology transmissions on the channel). An upper limit on a number of repetitions and an age of the indication may be imposed to reduce overhead on the channel.

In some aspects, the collaborative procedure may be used by WCDs for coexistence for V2X and an IEEE-based communication protocol WCDs required to detect a higher-priority tech on a technology-priority-based channel.

The indication may use a new dedicated cooperative awareness message (CAM) and/or decentralized environmental notification message (DENM) message type or a reserved field or bits in an existing message. The indication may be also provided on reserved bits of control channel or sidelink control information for V2X, or on reserved bits of a physical layer protocol data unit (PPDU) in case of DSRC or an IEEE-based communication protocol.

In some aspects, the collaborative procedure may be used by WCDs with a complementary procedure associated with a local autonomous V2X or an IEEE-based communication protocol detection procedure implemented for a local detection by a WCD. In some aspects, a WCD may use a weighting scheme to prioritize indications received from WCDs with a higher reliability for detection of the higher-priority technology.

For WCDs that support multi-channel operation, the indication may be transmitted on an anchor channel of an associated wireless communication technology (e.g., where the associated wireless communication technology has a higher priority) and/or on the technology-priority-based channel associated with the indication. In some aspects, a WCD may include an RSU (e.g., a type of network node). The RSU may have dual technology access across all the relevant channels and may have a dual detection capability and/or knowledge based at least in part on having awareness of the traffic on all the channels. In this way, the RSU may distribute an indication of channel occupancy (e.g., channel usage status) for lower priority technology devices that are within coverage range of the RSU.

In some aspects, a network node may share and aggregate indications from one or more WCDs that indicate occupancy or availability of the technology-priority-based channel. The network node may transmit the indication via a cellular network, if available to the WCD. In some aspects, the network node may generate a map based at least in part on the indications, with the map indicating where the technology-priority-based channel is occupied and/or where transmissions are likely to interfere with a higher-priority technology communication.

Based at least in part on transmitting the indication of the measurement associated with detection of a communication associated with a first priority technology (a higher-priority technology), and/or based at least in part on receiving indications from one or more additional WCDs, a WCD may improve detection of occupancy of a technology-priority-based channel. In this way, the WCD may reduce interference with communications associated with the first priority technology based at least in part on refraining from transmitting communications using a second priority technology (a lower-priority technology) on the technology-priority-based channel. Additionally, or alternatively, the WCD and/or the one or more additional WCDs may detect occupancy or availability of the technology-priority-based channel with reduced latency, which may conserve computing, power, and/or communication resources.

Figure 8:
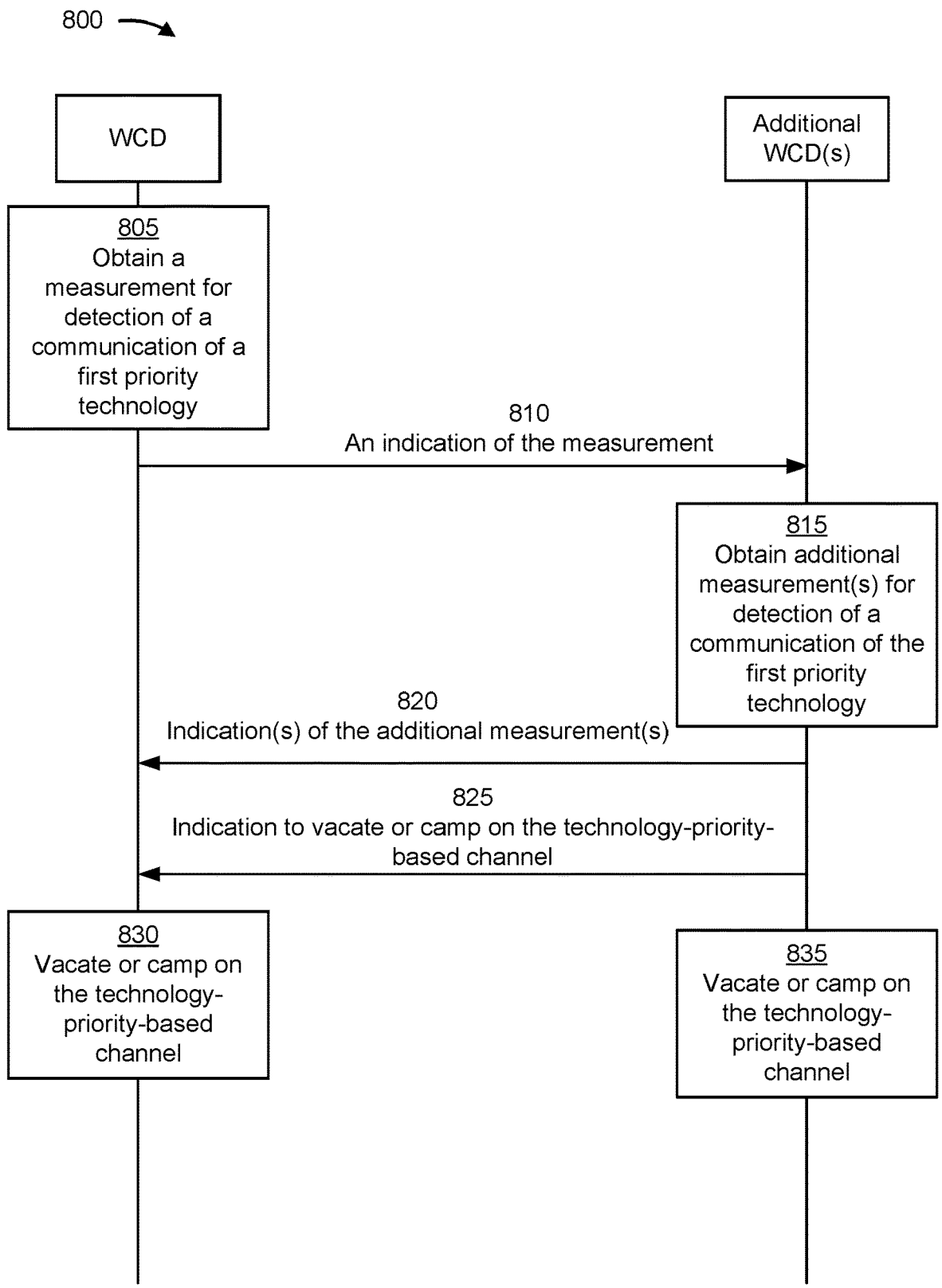
FIG. 8 is a diagram of an example associated with technology-priority-based channels, in accordance with the present disclosure.

FIG. 8 is a diagram of an example 800 associated with technology-priority-based channels, in accordance with the present disclosure. As shown in FIG. 8, a WCD (e.g., a UE) may communicate with one or more additional WCDs (e.g., UEs 120 or network nodes 110, such as an RSU). In some aspects, the WCD and the one or more additional WCDs may be part of a wireless network (e.g., wireless network 100).

The WCD and the one or more additional WCDs may communicate via a wireless communication technology using one or more technology-priority-based channels where the wireless communication technology is a lower-priority technology. For example, the WCD and the one or more additional WCDs may communicate on a technology-priority-based channel where a first priority technology has a higher priority than a second priority technology used by the WCD and the one or more additional WCDs. In some aspects, the technology-priority-based channel may support only a single wireless communication technology in a coverage area. For example, if the first priority technology is supported and/or active in a coverage area, the second priority technology should not be used on the channel within the same coverage area. The coverage area may be associated with a communication range (e.g., with a signal strength that satisfies a threshold) of one or more WCDs using the first priority technology.

In some aspects, the technology-priority-based channel includes a frequency bandwidth that is available to the first priority technology and is available to the second priority technology when not in use for any active communications using the first priority technology in a relevant area.

In some aspects, the first priority technology may be associated with a cellular network technology (e.g., V2X) and the second priority technology may be associated with a WLAN technology (e.g., an IEEE-based communication protocol). In some aspects, the first priority technology may be associated with a WLAN technology and the second priority technology may be associated with a cellular network technology.

As shown by reference number 805, the WCD may obtain a measurement for detection of a presence of a communication of a first priority technology. The WCD may obtain the measurement on a technology-priority-based channel in which the first priority technology has a higher priority than the second priority technology.

The WCD may obtain a measurement associated with a presence of energy received on a technology-priority-based channel, where at least some portion of signaling associated with the energy is not associated with the second priority technology. In some aspects, the WCD may identify the signaling as being associated with the first priority technology (e.g., indirect first priority technology detection based on side information related to demodulation and detection trials of messages transmitted using the second priority technology).

As shown by reference number 810, the WCD may transmit an indication that is based at least in part on the measurement (referred to as the local measurement). The WCD may transmit the indication via broadcasting and/or multicasting. In some aspects, the indication of the measurement may include an indication of whether to vacate the technology-priority-based channel and/or whether the technology-priority-based channel is occupied or available (e.g., with or without an explicit indication of the measurement). In some aspects, the indication of the measurement may include one or more parameters to evaluate a relevance of the indication. For example, the indication of the measurement may include indications of location information of the WCD, a device type of the WCD (e.g., UE, network node and/or RSU, among other examples), a reliability metric associated with the indication of detection of a presence of the communication associated with the first priority technology, a channel bandwidth associated with the indication, and/or a channel index associated with the indication, among other examples.

In some aspects, the WCD may transmit the indication of the measurement via the technology-priority-based channel. In some aspects, the WCD may transmit the indication via an additional technology-priority-based channel on which the second priority technology has a higher priority than the first priority technology. For example, the WCD may transmit the indication via an anchor channel associated with the second priority technology.

In some aspects, the WCD may transmit a plurality of repetitions of the indication of the measurement using one or more of different time resources or different frequency resources. For example, the WCD may transmit the plurality of repetitions on different channels, subchannels, and/or time resources. In this way, the indication may have diversity that may improve a likelihood of reception by the one or more additional WCDs. In some aspects, the WCD may transmit the plurality of repetitions only if the indication indicates that that the technology-priority-based channel is occupied by a communication using the first priority technology and/or an indication to vacate the technology-priority-based channel.

As shown by reference number 815, the one or more additional WCDs may obtain one or more additional measurements (e.g., local to each of the one or more additional WCDs) for detection of a communication of the first priority technology. The one or more additional WCDs may obtain the one or more additional measurements on the technology-priority-based channel in which the first priority technology has a higher priority than the second priority technology.

The one or more additional WCDs may obtain the one or more additional measurements associated with detection of energy received on the technology-priority-based channel, where signaling associated with the energy is not associated with the second priority technology. In some aspects, the one or more additional WCDs may identify the signaling as being associated with the first priority technology.

In some aspects, the one or more additional WCDs may include a network node (e.g., an RSU) that supports detection of transmissions of the first priority technology and the second priority technology and/or supports decoding of communications using the first priority technology and the second priority technology. In this way, the network node may have increased accuracy with detection, relative to a WCD that supports only one of the first priority technology or the second priority technology. Based at least in part on the WCD receiving an indication from the network node, the WCD may improve accuracy of a decision to D&V the technology-priority-based channel.

In some aspects, the one or more WCDs may obtain the one or more additional measurements and/or indications associated with the one or more additional measurements based at least in part on receiving an indication from an additional WCD. For example, a WCD of the one or more additional WCDs may include a UE or a network node (e.g., an RSU) that receives an indication associated with detection of a communication associated with the first priority technology. In some aspects, the WCD may forward the received indication to the WCD and/or one or more of the one or more additional WCDs after obtaining the indication from a different WCD. For example, the WCD may include a network node that receives indications from WCDs and forwards those indications (e.g., with or without combining those indications before forwarding).

As shown by reference number 820, the WCD may receive, and the one or more additional WCDs may transmit, one or more indications of the one or more additional measurements. The WCD may transmit the indication via broadcasting and/or multicasting. In some aspects, the one or more indications of the one or more measurements may include an indication of whether to vacate the technology-priority-based channel and/or whether the technology-priority-based channel is occupied or available (e.g., with or without an explicit indication of the measurement). In some aspects, the one or more indications of the one or more measurements may include one or more parameters to evaluate a relevance of the indication. For example, the one or more indications of the one or more measurements may include indications of location information of an associated WCD, of the at least one of the one or more WCDs, that transmitted at least one of the one or more additional indications WCD, a device type of the associated WCD (e.g., UE, network node and/or RSU, among other examples), a reliability metric associated with the indication of detection of a presence of the communication associated with the first priority technology, a channel bandwidth associated with the indication, and/or a channel index associated with the indication, among other examples.

In some aspects, the WCD may receive the one or more indications of the one or more measurements via the technology-priority-based channel. In some aspects, the WCD may receive the one or more indications via the additional technology-priority-based channel on which the second priority technology has a higher priority than the first priority technology. For example, the WCD may receive the indication via the anchor channel associated with the second priority technology.

In some aspects, the one or more additional WCDs may transmit a plurality of repetitions of the one or more indications of the one or more measurements using one or more of different time resources or different frequency resources. For example, the one or more additional WCDs may transmit the plurality of repetitions on different channels, sub-channels, and/or time resources. In this way, the one or more indications may have diversity that may improve a likelihood of reception by the WCD and/or one or more others of the additional WCDs.

In some aspects, the WCD and/or the one or more additional WCDs may transmit the indications described in connection with reference numbers 810 and/or 820 via reserved bits of a control channel communication.

As shown by reference number 825, the WCD may receive, and the one or more additional WCDs may transmit, an indication to vacate or camp on the technology-priority-based channel. For example, a WCD of the one or more additional WCDs may include a network node (e.g., an RSU) that transmits (e.g., broadcasts) an indication to vacate or camp on the technology-priority-based channel using the second priority technology when the technology-priority-based channel prioritizes the first priority technology over the second priority technology. The one or more additional WCDs may determine the indication to vacate or camp based at least in part on a local measurement of the channel to detect signals of the first priority technology.

As shown by reference number 830, the WCD may vacate or camp on the technology-priority-based channel. For example, the WCD may vacate or camp on the technology-priority-based channel based at least in part on the measurement obtained by the WCD and/or the one or more indications of the one or more additional measurements obtained by the one or more additional WCDs (e.g., via local detections) and transmitted to the WCD. In some aspects, the WCD may combine the local detection indication, or another measurement associated with the detection, and the one or more indications of the one or more additional WCDs using weighted combining. For example, the indication and indications of the one or more indications may be weighted based at least in part on an indication of detection indication reliability, device types, and/or locations, among other examples, of a WCD that obtained a local indication being combined with one or more additional received indications.

As shown by reference number 835, the one or more additional WCDs may vacate or camp on the technology-priority-based channel. For example, the one or more additional WCDs may vacate or camp on the technology-priority-based channel based at least in part on the local measurement and/or detection obtained by the WCD and one or more indications received from additional WCDs Based at least in part on transmitting the indication associated with the measurement related to detection of a communication associated with a first priority technology (a higher-priority technology), and/or based at least in part on receiving indications from one or more additional WCDs, a WCD may improve accuracy of detection of occupancy of a technology-priority-based channel. In this way, the WCD may reduce interference with communications associated with the first priority technology based at least in part on refraining from transmitting communications using a second priority technology (a lower-priority technology) on the technology-priority-based channel. Additionally, or alternatively, the WCD and/or the one or more additional WCDs may detect occupancy or availability of the technology-priority-based channel with reduced latency, which may conserve computing, power, and/or communication resources.

As indicated above, FIG. 8 is provided as an example. Other examples may differ from what is described with respect to FIG. 8.

Figure 9:
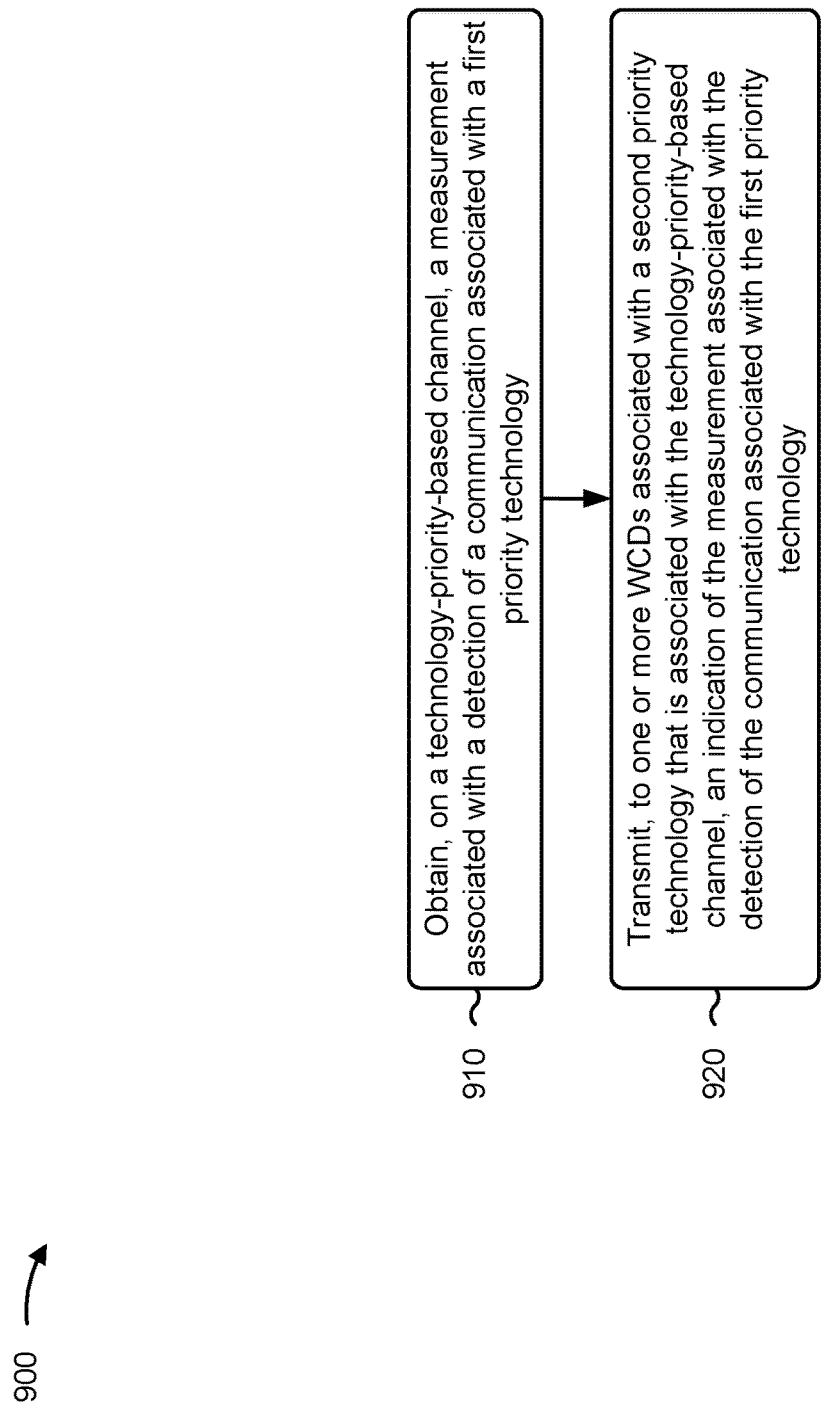
FIG. 9 is a diagram illustrating an example process performed, for example, by a wireless communication device (WCD), in accordance with the present disclosure.

FIG. 9 is a diagram illustrating an example process 900 performed, for example, by a WCD, in accordance with the present disclosure. Example process 900 is an example where the WCD (e.g., UE 120) performs operations associated with technology-priority-based channels.

As shown in FIG. 9, in some aspects, process 900 may include obtaining, on a technology-priority-based channel, a measurement associated with a detection of a communication associated with a first priority technology (block 910). For example, the WCD (e.g., using communication manager 140 and/or communication manager 1108 and/or reception component 1102, depicted in FIG. 11) may obtain, on a technology-priority-based channel, a measurement associated with a detection of a communication associated with a first priority technology, as described above.

As further shown in FIG. 9, in some aspects, process 900 may include transmitting, to one or more WCDs associated with a second priority technology that is associated with the technology-priority-based channel, an indication of the measurement associated with the detection of the communication associated with the first priority technology (block 920). For example, the WCD (e.g., using communication manager 140 and/or communication manager 1108 and/or transmission component 1104, depicted in FIG. 11) may transmit, to one or more WCDs associated with a second priority technology that is associated with the technology-priority-based channel, an indication of the measurement associated with the detection of the communication associated with the first priority technology, as described above.

Process 900 may include additional aspects, such as any single aspect or any combination of aspects described below and/or in connection with one or more other processes described elsewhere herein.

In a first aspect, on the technology-priority-based channel, only a single-technology-based communication is maintained within a communication range of communicating WCDs and the first priority technology has a higher priority to use the channel than the second priority technology.

In a second aspect, alone or in combination with the first aspect, transmitting the indication of the measurement comprises one or more of transmitting the indication via the technology-priority-based channel, or transmitting the indication via an additional technology-priority-based channel on which the second priority technology has a higher priority than the first priority technology.

In a third aspect, alone or in combination with the second aspect, transmitting the indication of the measurement comprises transmitting a plurality of repetitions of the indication of the measurement using one or more of different time resources or different frequency resources.

In a fourth aspect, alone or in combination with one or more of the first through third aspects, the indication of the measurement indicates that the technology-priority-based channel is occupied by the communication associated with the first priority technology, or the technology-priority-based channel is available for communication using the second priority technology.

In a fifth aspect, alone or in combination with one or more of the first through fourth aspects, the indication of the measurement indicates one or more of location information of the WCD, a device type of the WCD, a reliability metric associated with the indication of detection of a presence of the communication associated with the first priority technology, a channel bandwidth associated with the indication, or a channel index associated with the indication.

In a sixth aspect, alone or in combination with one or more of the first through fifth aspects, process 900 includes receiving, from at least one of the one or more WCDs associated with the second priority technology, one or more additional indications of measurements associated with a detection, on the technology-priority-based channel, of the communication associated with the first priority technology.

In a seventh aspect, alone or in combination with one or more of the first through sixth aspects, the one or more additional indications of measurements indicate one or more of that the technology-priority-based channel is occupied by the communication associated with the first priority technology, that the technology-priority-based channel is available for communication using the second priority technology, location information of an associated WCD, of the at least one of the one or more WCDs, that transmitted at least one of the one or more additional indications, a device type of the associated WCD, a reliability metric associated with the indication of detection of a presence of the communication associated with the first priority technology at the associated WCD, channeling bandwidths associated with the one or more additional indications, or channeling indexes associated with the one or more additional indications.

In an eighth aspect, alone or in combination with one or more of the first through seventh aspects, process 900 includes selectively vacating or camping on the technology-priority-based channel based at least in part on the measurement and the one or more additional indications of measurements.

In a ninth aspect, alone or in combination with one or more of the first through eighth aspects, the first priority technology is associated with a cellular network technology and the second priority technology is associated with a WLAN technology, or wherein the first priority technology is associated with a WLAN technology and the second priority technology is associated with a cellular network technology.

In a tenth aspect, alone or in combination with one or more of the first through ninth aspects, transmitting the indication of the measurement comprises transmitting the indication of the measurement via reserved bits of a control channel communication.

In an eleventh aspect, alone or in combination with one or more of the first through tenth aspects, process 900 includes receiving, from a network node, an indication to vacate or to camp on the technology-priority-based channel.

In a twelfth aspect, alone or in combination with one or more of the first through eleventh aspects, the technology-priority-based channel comprises a frequency bandwidth that is available to the first priority technology and is available to the second priority technology when not in use for communications using the first priority technology.

In a thirteenth aspect, alone or in combination with one or more of the first through twelfth aspects, transmitting the indication of the measurement comprises broadcasting the indication of the measurement, or multicasting the indication of the measurement.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
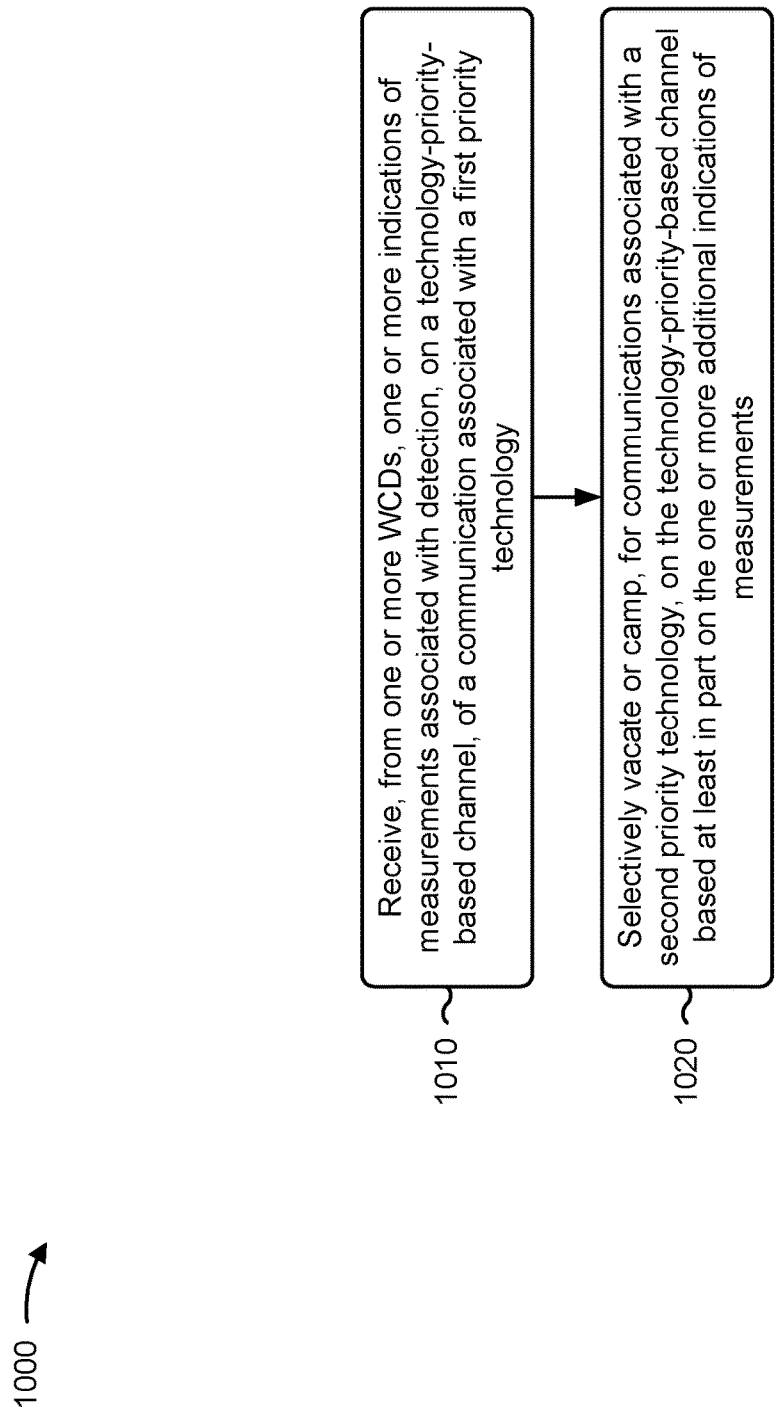
FIG. 10 is a diagram illustrating an example process performed, for example, by a WCD, in accordance with the present disclosure.

FIG. 10 is a diagram illustrating an example process 1000 performed, for example, by a WCD, in accordance with the present disclosure. Example process 1000 is an example where the WCD (e.g., UE 120) performs operations associated with technology-priority-based channels.

As shown in FIG. 10, in some aspects, process 1000 may include receiving, from one or more WCDs, one or more indications of measurements associated with detection, on a technology-priority-based channel, of a communication associated with a first priority technology (block 1010). For example, the WCD (e.g., using communication manager 140 and/or communication manager 1108 and/or reception component 1102, depicted in FIG. 11) may receive, from one or more WCDs, one or more indications of measurements associated with detection, on a technology-priority-based channel, of a communication associated with a first priority technology, as described above.

As further shown in FIG. 10, in some aspects, process 1000 may include selectively vacating or camping, for communications associated with a second priority technology, on the technology-priority-based channel based at least in part on the one or more additional indications of measurements (block 1020). For example, the WCD (e.g., using communication manager 140 and/or communication manager 1108, depicted in FIG. 11) may selectively vacate or camp, for communications associated with a second priority technology, on the technology-priority-based channel based at least in part on the one or more additional indications of measurements, as described above.

Process 1000 may include additional aspects, such as any single aspect or any combination of aspects described below and/or in connection with one or more other processes described elsewhere herein.

In a first aspect, process 1000 includes obtaining, on the technology-priority-based channel, a measurement associated with detection of the communication associated with the first priority technology, and selectively vacating or camping on the technology-priority-based channel is further based at least in part on the measurement.

In a second aspect, alone or in combination with the first aspect, on the technology-priority-based channel, only a single-technology-based communication is maintained within a communication range of communicating WCDs and the first priority technology has a higher priority to use the channel than the second priority technology.

In a third aspect, alone or in combination with one or more of the first and second aspects, receiving the one or more indications of measurements comprises one or more of receiving the indication via the technology-priority-based channel, or receiving the indication via an additional technology-priority-based channel on which the second priority technology has a higher priority than the first priority technology.

In a fourth aspect, alone or in combination with one or more of the first through third aspects, the one or more indications of the measurements indicate that the technology-priority-based channel is occupied by the communication associated with the first priority technology, or the technology-priority-based channel is available for communication using the second priority technology.

In a fifth aspect, alone or in combination with one or more of the first through fourth aspects, an indication of the one or more indications of the measurements, received from an associated WCD, indicates one or more of location information of the associated WCD, a device type of the associated WCD, a reliability metric associated with the indication of detection of a presence of the communication associated with the first priority technology at the associated WCD, a channel bandwidth associated with the indication, or a channel index associated with the indication.

In a sixth aspect, alone or in combination with one or more of the first through fifth aspects, the first priority technology is associated with a cellular network technology and the second priority technology is associated with a WLAN technology, or wherein the first priority technology is associated with a WLAN technology and the second priority technology is associated with a cellular network technology.

In a seventh aspect, alone or in combination with one or more of the first through sixth aspects, receiving the one or more indications of the measurements comprises receiving the one or more indications of the measurements via reserved bits of a control channel communication.

In an eighth aspect, alone or in combination with one or more of the first through seventh aspects, the one or more WCDs comprises a network node, and wherein the one or more indications of measurements comprises an indication to vacate or to camp on the technology-priority-based channel for communications using the second priority technology.

In a ninth aspect, alone or in combination with one or more of the first through eighth aspects, receiving the one or more indications of measurements comprises receiving the one or more indications of measurements via a broadcast communication, or a multicast communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
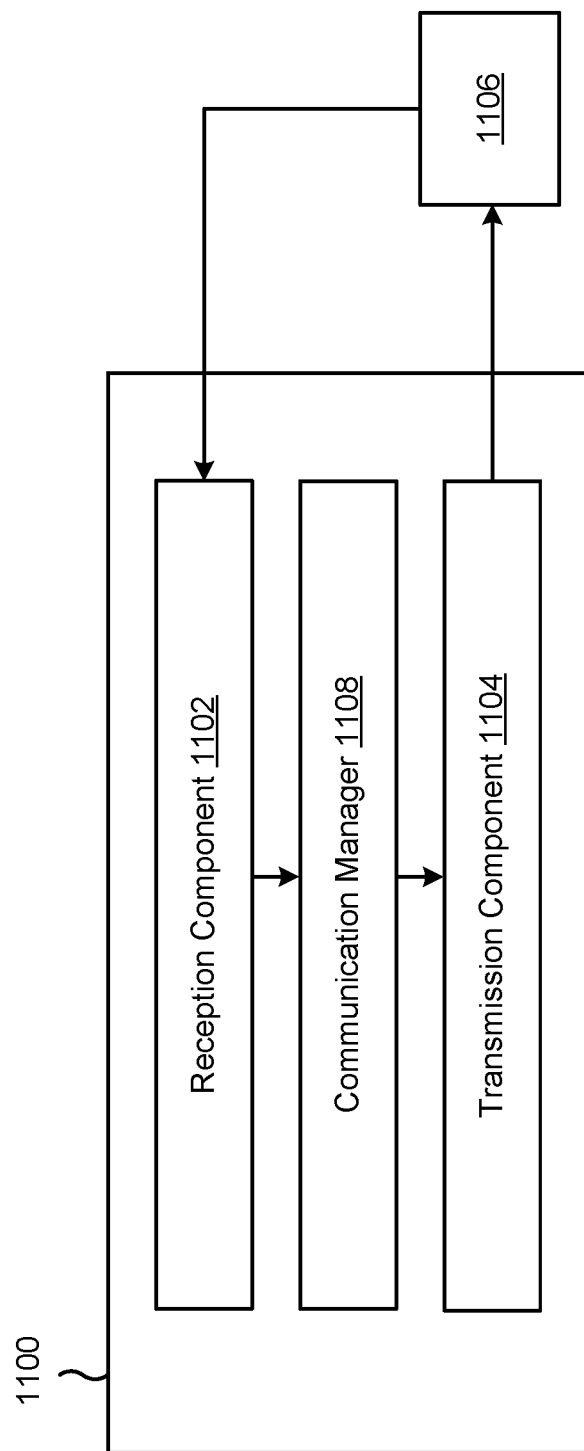
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a WCD, or a WCD may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., communication manager 140).

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the WCD described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node and/or the UE (e.g., a WCD) described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node and/or the UE described in connection with FIG. 2. In some aspects, the transmission component 1104 may be co-located with the reception component 1102 in a transceiver.

The communication manager 1108 and/or the reception component 1102 may obtain, on a technology-priority-based channel, a measurement associated with a detection of a communication associated with a first priority technology. The transmission component 1104 may transmit, to one or more WCDs associated with a second priority technology that is associated with the technology-priority-based channel, an indication of the measurement associated with the detection of the communication associated with the first priority technology.

The reception component 1102 may receive, from at least one of the one or more WCDs associated with the second priority technology, one or more additional indications of measurements associated with detection, on the technology-priority-based channel, of the communication associated with the first priority technology.

The communication manager 1108 may selectively vacate or camp on the technology-priority-based channel based at least in part on the measurement and the one or more additional indications of measurements.

The reception component 1102 may receive, from a network node, an indication to vacate or to camp on the technology-priority-based channel.

The reception component 1102 may receive, from one or more WCDs, one or more indications of measurements associated with detection, on a technology-priority-based channel, of a communication associated with a first priority technology. The communication manager 1108 may selectively vacate or camp, for communications associated with a second priority technology, on the technology-priority-based channel based at least in part on the one or more additional indications of measurements.

The communication manager 1108 and/or the reception component 1102 may obtain, on the technology-priority-based channel, a measurement associated with detection of the communication associated with the first priority technology wherein selectively vacating or camping on the technology-priority-based channel is further based at least in part on the measurement.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a wireless communication device (WCD), comprising: obtaining, on a technology-priority-based channel, a measurement associated with a detection of a communication associated with a first priority technology; and transmitting, to one or more WCDs associated with a second priority technology that is associated with the technology-priority-based channel, an indication of the measurement associated with the detection of the communication associated with the first priority technology.

Aspect 2: The method of Aspect 1, wherein, on the technology-priority-based channel, only a single-technology-based communication is maintained within a communication range of communicating WCDs and the first priority technology has a higher priority to use the channel than the second priority technology.

Aspect 3: The method of any of Aspects 1-2, wherein transmitting the indication of the measurement comprises one or more of: transmitting the indication via the technology-priority-based channel, or transmitting the indication via an additional technology-priority-based channel on which the second priority technology has a higher priority than the first priority technology.

Aspect 4: The method of any of Aspects 1-3, wherein transmitting the indication of the measurement comprises: transmitting a plurality of repetitions of the indication of the measurement using one or more of different time resources or different frequency resources.

Aspect 5: The method of any of Aspects 1-4, wherein the indication of the measurement indicates that: the technology-priority-based channel is occupied by the communication associated with the first priority technology, or the technology-priority-based channel is available for communication using the second priority technology.

Aspect 6: The method of any of Aspects 1-5, wherein the indication of the measurement indicates one or more of: location information of the WCD, a device type of the WCD, a reliability metric associated with the indication of detection of a presence of the communication associated with the first priority technology, a channel bandwidth associated with the indication, or a channel index associated with the indication.

Aspect 7: The method of any of Aspects 1-6, further comprising: receiving, from at least one of the one or more WCDs associated with the second priority technology, one or more additional indications of measurements associated with detection, on the technology-priority-based channel, of the communication associated with the first priority technology.

Aspect 8: The method of Aspect 7, wherein the one or more additional indications of measurements indicate one or more of: that the technology-priority-based channel is occupied by the communication associated with the first priority technology, that the technology-priority-based channel is available for communication using the second priority technology, location information of an associated WCD, of the at least one of the one or more WCDs, that transmitted at least one of the one or more additional indications, a device type of the associated WCD, a reliability metric associated with the indication of detection of a presence of the communication associated with the first priority technology at the associated WCD, channel bandwidths associated with the one or more additional indications, or channel indexes associated with the one or more additional indications.

Aspect 9: The method of Aspect 7, further comprising: selectively vacating or camping on the technology-priority-based channel based at least in part on the measurement and the one or more additional indications of measurements.

Aspect 10: The method of any of Aspects 1-9, wherein the first priority technology is associated with a cellular network technology and the second priority technology is associated with a wireless local area network (WLAN) technology, or wherein the first priority technology is associated with a WLAN technology and the second priority technology is associated with a cellular network technology.

Aspect 11: The method of any of Aspects 1-10, wherein transmitting the indication of the measurement comprises: transmitting the indication of the measurement via reserved bits of a control channel communication.

Aspect 12: The method of any of Aspects 1-11, further comprising receiving, from a network node, an indication to vacate or to camp on the technology-priority-based channel.

Aspect 13: The method of any of Aspects 1-12, wherein the technology-priority-based channel comprises a frequency bandwidth that is available to the first priority technology and is available to the second priority technology when not in use for communications using the first priority technology.

Aspect 14: The method of any of Aspects 1-13, wherein transmitting the indication of the measurement comprises: broadcasting the indication of the measurement, or multi-casting the indication of the measurement.

Aspect 15: A method of wireless communication performed by a wireless communication device (WCD), comprising: receiving, from one or more WCDs, one or more indications of measurements associated with detection, on a technology-priority-based channel, of a communication associated with a first priority technology; and selectively vacating or camping, for communications associated with a second priority technology, on the technology-priority-based channel based at least in part on the one or more additional indications of measurements.

Aspect 16: The method of Aspect 15, further comprising obtaining, on the technology-priority-based channel, a measurement associated with detection of the communication associated with the first priority technology, wherein selectively vacating or camping on the technology-priority-based channel is further based at least in part on the measurement.

Aspect 17: The method of any of Aspects 15-16, wherein, on the technology-priority-based channel, only a single-technology-based communication is maintained within a communication range of communicating WCDs and the first priority technology has a higher priority to use the channel than the second priority technology.

Aspect 18: The method of any of Aspects 15-17, wherein receiving the one or more indications of measurements comprises one or more of: receiving the indication via the technology-priority-based channel, or receiving the indication via an additional technology-priority-based channel on which the second priority technology has a higher priority than the first priority technology.

Aspect 19: The method of any of Aspects 15-18, wherein the one or more indications of the measurements indicate that: the technology-priority-based channel is occupied by the communication associated with the first priority technology, or the technology-priority-based channel is available for communication using the second priority technology.

Aspect 20: The method of any of Aspects 15-19, wherein an indication of the one or more indications of the measurements, received from an associated WCD, indicates one or more of: location information of the associated WCD, a device type of the associated WCD, a reliability metric associated with the indication of detection of a presence of the communication associated with the first priority technology at the associated WCD, a channel bandwidth associated with the indication, or a channel index associated with the indication.

Aspect 21: The method of any of Aspects 15-20, wherein the first priority technology is associated with a cellular network technology and the second priority technology is associated with a wireless local area network (WLAN) technology, or wherein the first priority technology is associated with a WLAN technology and the second priority technology is associated with a cellular network technology.

Aspect 22: The method of any of Aspects 15-21, wherein receiving the one or more indications of the measurements comprises: receiving the one or more indications of the measurements via reserved bits of a control channel communication.

Aspect 23: The method of any of Aspects 15-22, wherein the one or more WCDs comprises a network node, and wherein the one or more indications of measurements comprises an indication to vacate or to camp on the technology-priority-based channel for communications using the second priority technology.

Aspect 24: The method of any of Aspects 15-23, wherein receiving the one or more indications of measurements comprises receiving the one or more indications of measurements via: a broadcast communication, or a multicast communication.

Aspect 25: An apparatus for wireless communication at a device, comprising a processor; memory coupled with the processor; and instructions stored in the memory and executable by the processor to cause the apparatus to perform the method of one or more of Aspects 1-24.

Aspect 26: A device for wireless communication, comprising a memory and one or more processors coupled to the memory, the one or more processors configured to perform the method of one or more of Aspects 1-24.

Aspect 27: An apparatus for wireless communication, comprising at least one means for performing the method of one or more of Aspects 1-24.

Aspect 28: A non-transitory computer-readable medium storing code for wireless communication, the code comprising instructions executable by a processor to perform the method of one or more of Aspects 1-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device (WCD) for wireless communication, comprising:
 one or more memories; and
 one or more processors, coupled to the one or more memories, that cause the WCD to:
  obtain, on a technology-priority-based channel, a measurement associated with a detection of a communication associated with a first priority technology;
  transmit, to one or more WCDs associated with a second priority technology that is associated with the technology-priority-based channel, an indication of the measurement; and
  receive from at least one of the one or more WCDs associated with the second priority technology, one or more additional indications of measurements associated with detection, on the technology-priority-based channel, of the communication associated with the first priority technology.

2. The WCD of claim 1, wherein, on the technology-priority-based channel, only a single-technology-based communication is maintained within a communication range of communicating WCDs and the first priority technology has a higher priority to use the channel than the second priority technology.

3. The WCD of claim 1, wherein the one or more processors, to transmit the indication of the measurement, cause the WCD to:
 transmit the indication via the technology-priority-based channel, or
 transmit the indication via an additional technology-priority-based channel on which the second priority technology has a higher priority than the first priority technology.

4. The WCD of claim 1, wherein the one or more processors, to transmit the indication of the measurement, cause the WCD to:
 transmit a plurality of repetitions of the indication of the measurement using one or more of different time resources or different frequency resources.

5. The WCD of claim 1, wherein the indication of the measurement indicates that:
 the technology-priority-based channel is occupied by the communication associated with the first priority technology, or
 the technology-priority-based channel is available for communication using the second priority technology.

6. The WCD of claim 1, wherein the indication of the measurement indicates one or more of:
 location information of the WCD,
 a device type of the WCD,
 a reliability metric associated with detection of a presence of the communication associated with the first priority technology,
 a channel bandwidth associated with the indication, or
 a channel index associated with the indication.

7. The WCD of claim 1, wherein the one or more additional indications of the measurements indicate one or more of:
 that the technology-priority-based channel is occupied by the communication associated with the first priority technology,
 that the technology-priority-based channel is available for communication using the second priority technology,
 location information of an associated WCD, of the at least one of the one or more WCDs, that transmitted at least one of the one or more additional indications,
 a device type of the associated WCD,
 a reliability metric associated with detection of a presence of the communication associated with the first priority technology at the associated WCD,
 channel bandwidths associated with the one or more additional indications, or channel indexes associated with the one or more additional indications.

8. The WCD of claim 1, wherein the one or more processors further cause the WCD to:
selectively vacate or camp on the technology-priority-based channel based at least in part on the measurement and the one or more additional indications of the measurements.

9. The WCD of claim 1, wherein the first priority technology is associated with a cellular network technology and the second priority technology is associated with a wireless local area network (WLAN) technology, or
wherein the first priority technology is associated with the WLAN technology and the second priority technology is associated with the cellular network technology.

10. The WCD of claim 1, wherein the one or more processors, to transmit the indication of the measurement, cause the WCD to:
transmit the indication of the measurement via reserved bits of a control channel communication.

11. The WCD of claim 1, wherein the one or more processors further cause the WCD to receive, from a network node, an indication to vacate or to camp on the technology-priority-based channel.

12. The WCD of claim 1, wherein the technology-priority-based channel comprises a frequency bandwidth that is available to the first priority technology and is available to the second priority technology when not in use for communications using the first priority technology.

13. The WCD of claim 1, wherein the one or more processors, to transmit the indication of the measurement, cause the WCD to:
broadcast the indication of the measurement, or
multicast the indication of the measurement.

14. A WCD for wireless communication, comprising:
one or more memories; and
one or more processors, coupled to the one or more memories, that cause the WCD to:
receive, from one or more WCDs, one or more indications of a measurement associated with a detection, on a technology-priority-based channel, of a communication associated with a first priority technology;
selectively vacate or camp, for communications associated with a second priority technology, on the technology-priority-based channel based at least in part on the one or more indications of the measurement; and
transmit, to at least one of the one or more WCDs, one or more additional indications of measurements associated with detection, on the technology-priority-based channel, of the communication associated with the first priority technology.

15. The WCD of claim 14, wherein the one or more processors further cause the WCD to obtain, on the technology-priority-based channel, the measurement,
wherein the one or more processors, to selectively vacate or camp on the technology-priority-based channel further cause the WCD to selectively vacate or camp based at least in part on the measurement.

16. The WCD of claim 14, wherein, on the technology-priority-based channel, only a single-technology-based communication is maintained within a communication range of communicating WCDs and the first priority technology has a higher priority to use the channel than the second priority technology.

17. The WCD of claim 14, wherein the one or more processors, to receive the one or more indications of the measurement, cause the WCD to:
receive the one or more indications via the technology-priority-based channel, or
receive the one or more indications via an additional technology-priority-based channel on which the second priority technology has a higher priority than the first priority technology.

18. The WCD of claim 14, wherein the one or more indications of the measurement indicate that:
the technology-priority-based channel is occupied by the communication associated with the first priority technology, or
the technology-priority-based channel is available for communication using the second priority technology.

19. The WCD of claim 14, wherein an indication of the one or more indications of the measurement, received from an associated WCD, indicates one or more of:
location information of the associated WCD,
a device type of the associated WCD,
a reliability metric associated with the indication of detection of a presence of the communication associated with the first priority technology at the associated WCD,
a channel bandwidth associated with the indication, or
a channel index associated with the indication.

20. The WCD of claim 14, wherein the first priority technology is associated with a cellular network technology and the second priority technology is associated with a wireless local area network (WLAN) technology, or
wherein the first priority technology is associated with the WLAN technology and the second priority technology is associated with the cellular network technology.

21. The WCD of claim 14, wherein the one or more processors, to receive the one or more indications of the measurement, cause the WCD to:
receive the one or more indications of the measurement via reserved bits of a control channel communication.

22. The WCD of claim 14, wherein the one or more WCDs comprises a network node, and
wherein the one or more indications of the measurement comprises an indication to vacate or to camp on the technology-priority-based channel for communications using the second priority technology.

23. The WCD of claim 14, wherein the one or more processors, to receive the one or more indications of the measurement, cause the WCD to receive the one or more indications of the measurement via:
a broadcast communication, or
a multicast communication.

24. A method of wireless communication performed by a wireless communication device (WCD), comprising:
obtaining, on a technology-priority-based channel, a measurement associated with a detection of a communication associated with a first priority technology;
transmitting, to one or more WCDs associated with a second priority technology that is associated with the technology-priority-based channel, an indication of the measurement; and
receiving from at least one of the one or more WCDs associated with the second priority technology, one or more additional indications of measurements associated with detection, on the technology-priority-based channel, of the communication associated with the first priority technology.

25. The method of claim 24, wherein, on the technology-priority-based channel, only a single-technology-based communication is maintained within a communication range of communicating WCDs and the first priority technology has a higher priority to use the channel than the second priority technology.

26. The method of claim 24, wherein transmitting the indication of the measurement comprises one or more of:
- transmitting the indication via the technology-priority-based channel, or
- transmitting the indication via an additional technology-priority-based channel on which the second priority technology has a higher priority than the first priority technology.

27. A method of wireless communication performed by a wireless communication device (WCD), comprising:
- receiving, from one or more WCDs, one or more indications of a measurement associated with a detection, on a technology-priority-based channel, of a communication associated with a first priority technology;
- selectively vacating or camping, for communications associated with a second priority technology, on the technology-priority-based channel based at least in part on the one or more indications of the measurement; and
- transmitting, to at least one of the one or more WCDs, one or more additional indications of measurements associated with detection, on the technology-priority-based channel, of the communication associated with the first priority technology.

28. The method of claim 27, further comprising obtaining, on the technology-priority-based channel, the measurement, wherein selectively vacating or camping on the technology-priority-based channel is further based at least in part on the measurement.

29. The method of claim 27, wherein, on the technology-priority-based channel, only a single-technology-based communication is maintained within a communication range of communicating WCDs and the first priority technology has a higher priority to use the channel than the second priority technology.

30. The WCD of claim 1, wherein the one or more WCDs associated with the second priority technology are allowed to use the technology-priority-based channel when there is no active WCD of higher priority than the one or more WCDs associated with the second priority technology using the technology-priority-based channel and within a coverage area of the one or more WCDs associated with the second priority technology.

* * * * *